(12) United States Patent
Hwang et al.

(10) Patent No.: US 6,492,934 B1
(45) Date of Patent: Dec. 10, 2002

(54) METHOD OF DERIVING GROUND SPEED FOR DESCENDING AIRCRAFT

(75) Inventors: Patrick Y. Hwang, Marion, IA (US); Shih-Yih R. Young, Marion, IA (US)

(73) Assignee: Rockwell Collins, Cedar Rapids, IA (US)

(*) Notice: Subject to any disclaimer, the term of this patent is extended or adjusted under 35 U.S.C. 154(b) by 0 days.

(21) Appl. No.: 09/923,086

(22) Filed: Aug. 6, 2001

(51) Int. Cl.[7] ............................................. G01S 13/60
(52) U.S. Cl. ...................... 342/33; 342/104; 342/105; 342/120; 342/175; 342/195; 342/357.01; 342/357.06; 701/3; 701/4; 701/7
(58) Field of Search .......................... 342/33, 34, 35, 342/104–109, 113–123, 147, 175, 195, 357.01–357.17; 244/183–195; 701/1, 3–18, 300, 301, 302

(56) References Cited

U.S. PATENT DOCUMENTS

| | | | | |
|---|---|---|---|---|
| 3,789,197 A | * | 1/1974 | Games ........................... | 701/3 |
| 4,316,252 A | * | 2/1982 | Cooper ......................... | 701/16 |
| 4,646,244 A | * | 2/1987 | Bateman et al. ............. | 701/301 |
| 4,723,123 A | * | 2/1988 | Marlow et al. ................ | 342/6 |
| 5,826,834 A | * | 10/1998 | Potter et al. ................. | 244/195 |

FOREIGN PATENT DOCUMENTS

EP    0708393 A1 * 4/1996    ............ G05D/1/06

* cited by examiner

*Primary Examiner*—Bernarr E. Gregory
(74) *Attorney, Agent, or Firm*—Nathan O. Jensen; Kyle Eppele

(57) ABSTRACT

The present invention is a method of deriving a ground speed of an aircraft on a descent along a flight path. A vertical speed signal is produced as a function of an altitude signal and a vertical acceleration signal. The vertical speed signal is transformed to a nominal ground speed signal based upon a glide slope defined by a glide slope beam. A correction is produced based on a glide slope deviation rate representative of deviation of the aircraft from the glide slope. The nominal ground speed signal is corrected with the correction to produce a corrected ground speed signal. The corrected ground speed signal is filtered with a horizontal acceleration signal and a runway heading signal to produce a smoothed ground speed signal.

21 Claims, 5 Drawing Sheets

METHOD OF DERIVING GROUND SPEED FOR DESCENDING AIRCRAFT

BACKGROUND OF THE INVENTION

The present invention relates to the field of aircraft guidance systems. More specifically, the present invention relates to a system and method for monitoring the ground speed of a descending aircraft.

The interest in developing a global positioning satellite (GPS) sensor as a low-cost alternative to high-grade inertial reference systems (IRS) for various avionics applications has been germinating for some time now. Recently, there has been increased interest in the application of such an alternative to support head-up guidance systems (HGS).

Head-up guidance systems (HGS) are used primarily to enhance a pilot's situation awareness and provide guidance to pilots during low visibility conditions. With HGS, pilots can focus on external view and read critical flight data from the HGS instead of from the instrument panel. Although HGS can be used during all phases of flight, they are most renowned for providing guidance during approach and landing. Current HGS use instrument landing systems (ILS) for position guidance during approach and landing, and are currently coupled to high-grade inertial reference systems (IRS) to provide display orientation parameters. Attitude heading reference systems (AHRS) can provide some of these parameters with adequate accuracy, but they do not provide ground speed and track angle. An integrated GPS/AHRS function can provide improved attitude accuracy along with ground speed and track angle, but, by itself, the integrity of the ground speed and track angle are tied to the well-known shortcoming of standalone GPS integrity. This shortcoming needs to be rectified with enhancements from information sources external to the integrated GPS/AHRS function itself.

Accordingly, there is a need for a system and method for accurately monitoring the ground speed of a descending aircraft that is completely independent from the GPS function.

BRIEF SUMMARY OF THE INVENTION

The present invention is a system and method for deriving a ground speed of an aircraft on a descent along a flight path. A vertical speed signal is produced as a function of an altitude signal and a vertical acceleration signal. The vertical speed signal is transformed to a nominal ground speed signal based upon a glide slope defined by a glide slope beam. A correction is produced based on a glide slope deviation rate representative of deviation of the aircraft from the glide slope. Based on the nominal ground speed signal and the deviation correction, a corrected ground speed signal is produced. The corrected ground speed signal is filtered with a horizontal acceleration signal and a runway heading signal to produce a smoothed ground speed signal.

DETAILED DESCRIPTION

Figure 1:
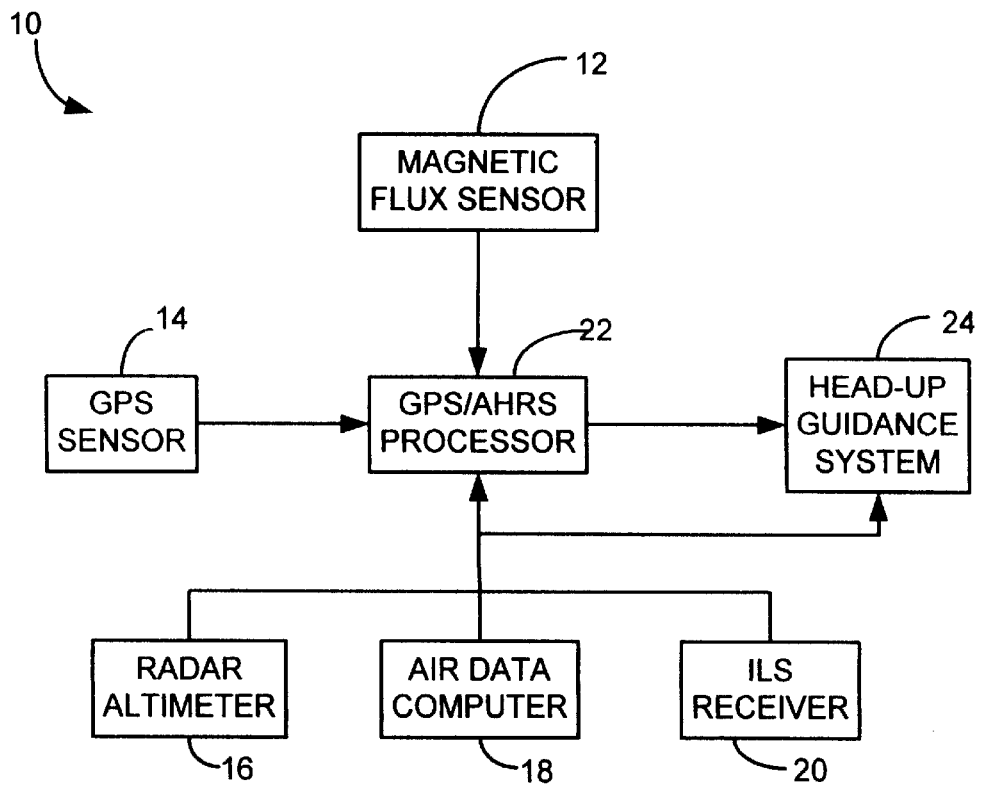
FIG. 1 shows a block diagram of an aircraft guidance system incorporating the present invention.

FIG. 1 shows a block diagram of an aircraft guidance system 10 incorporating the present invention. Aircraft guidance system 10 is a multiple component system which includes magnetic flux sensor 12, GPS sensor 14, radar altimeter 16, air data computer 18, ILS receiver 20, GPS/AHRS processor 22, and head-up guidance system (HGS) 24.

GPS/AHRS processor 22 accepts data from magnetic flux sensor 12, GPS sensor 14, radar altimeter 16, air data computer (ADC) 18, and ILS receiver 20. Magnetic flux sensor 12 provides magnetic heading data; GPS sensor 14 provides GPS data; radar altimeter 16 provides altitude data; ADC 18 includes a baro-altimeter which provides baro-altitude data; and ILS receiver 20 provides glideslope deviation data. Glidepath angle and runway heading data are also provided to GPS/AHRS processor 22 from approach plate charts by the pilot. The data output of GPS/AHRS processor 22, in turn, supports HGS 24. GPS/AHRS processor 22 provides attitude, vertical speed, and ground speed data. HGS 24 also accepts data from radar altimeter 16, ADC 18, and ILS receiver 20.

Figure 2:
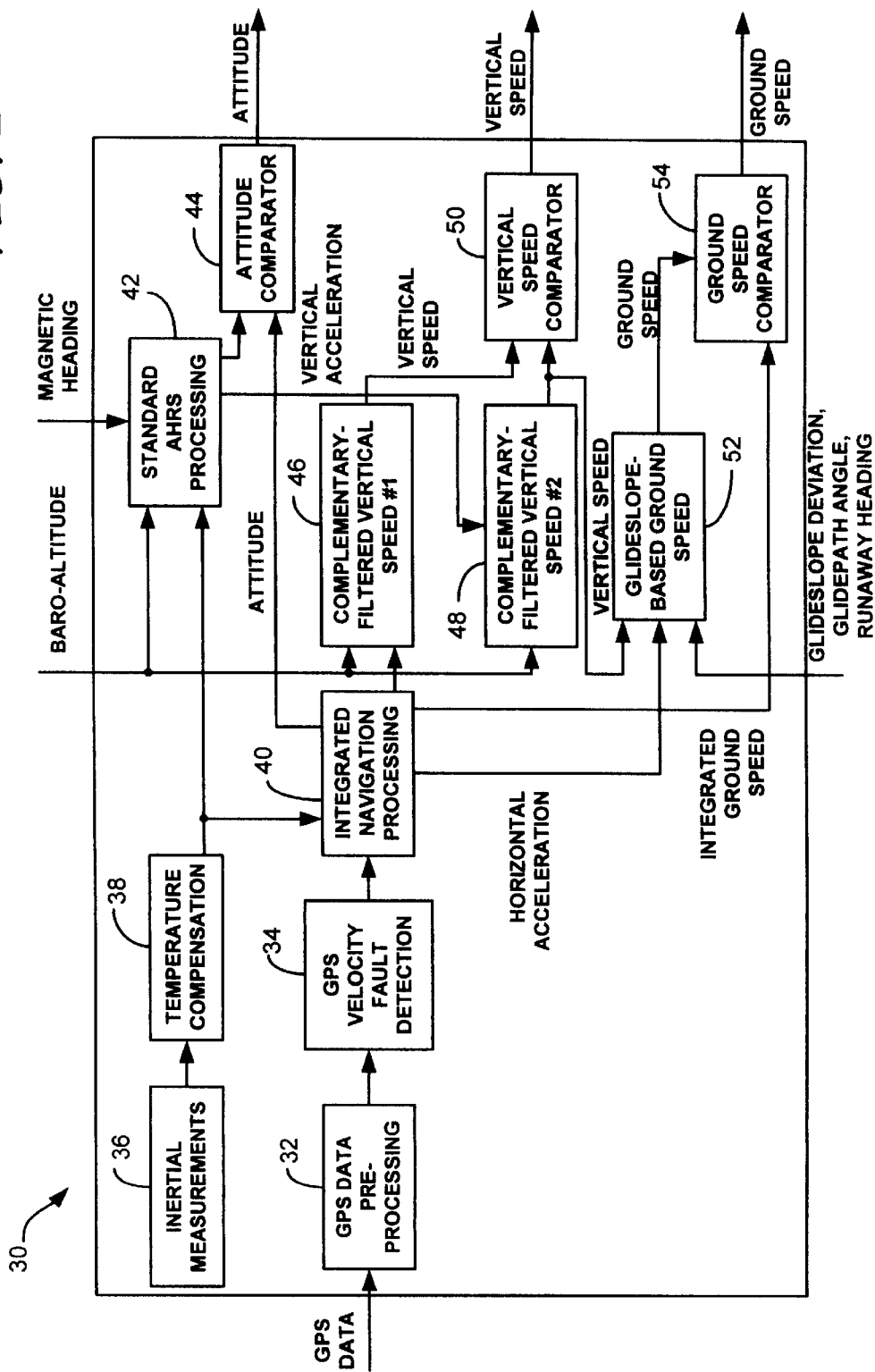
FIG. 2 shows a block diagram of a GPS/AHRS processor of the aircraft guidance system of FIG. 1.

FIG. 2 shows a functional block diagram 30 of the processing that occurs within GPS/AHRS processor 22 of aircraft guidance system 10 of FIG. 1. The GPS data from GPS sensor 14 of aircraft guidance system 10 is initially pre-processed at step 32. The GPS data is then checked for soft failures for GPS deltaranges at step 34. Soft failures can be caused by a slow drifting or a sudden shift of the satellite clock frequency, errors in broadcast ephemeris data for satellite clock corrections, etc. Inertial measurements are taken in step 36, and compensated for temperature in step 38. The GPS data from step 34 and the inertial data from step 38 are each used in step 40 for Integrated Navigation processing. The output data of step 40 include attitude, vertical acceleration, horizontal acceleration, and ground speed (each compensated for accelerometer bias errors). The inertial data from step 38 is also used in step 42 for standard AHRS processing. In addition, the baro-altitude signal from ADC 18 and the magnetic heading signal from magnetic flux sensor 12 are processed in step 42. The output data from step 42 include attitude and vertical acceleration. Step 44 compares the Integrated Navigation attitude signal from step 40 to the standard AHRS attitude signal from step 42. Any out-of-bound comparison is flagged as an alert. The Integrated Navigation attitude signal will be the output attitude signal of GPS/AHRS processor 22 unless an alert is flagged, in which case the standard AHRS attitude signal will be the output attitude signal. The vertical acceleration signal from step 40 and the baro-altitude signal from ADC 18 are complementary filtered in step 46 to produce a first complementary-filtered vertical speed signal. The standard AHRS vertical acceleration signal from step 42 and the baro-altitude signal from ADC 18 are complementary filtered in step 48 to produce a second complementary-filtered vertical speed signal. Step 50 compares the first and second complementary-filtered vertical speed signals from steps 46 and 48 respectively, and any out-of-bound comparison is flagged as an alert. The first complementary-filtered vertical speed signal from step 46 will be the output vertical speed signal of GPS/AHRS processor 22 unless an alert is flagged, in which case the second complementary-filtered vertical speed signal from step 48 will be the output vertical speed signal. The Integrated Navigation horizontal acceleration signal from step 40, the complementary-filtered vertical speed signal from step 48, the glideslope deviation signal from ILS receiver 20, and the glidepath angle and runway heading signals from approach plate charts are all used in step 52 to generate a glideslope-based ground speed signal. Step 54 compares the Integrated Navigation ground speed signal from step 40 to the glideslope-based ground speed signal from step 52, and any out-of-bound comparison is flagged as an alert. The Integrated Navigation ground speed signal from step 40 will be the output ground speed signal of GPS/AHRS processor 22 unless an alert is flagged, in which case the glideslope-based ground speed signal from step 52 will be the output ground speed signal.

Figure 3:
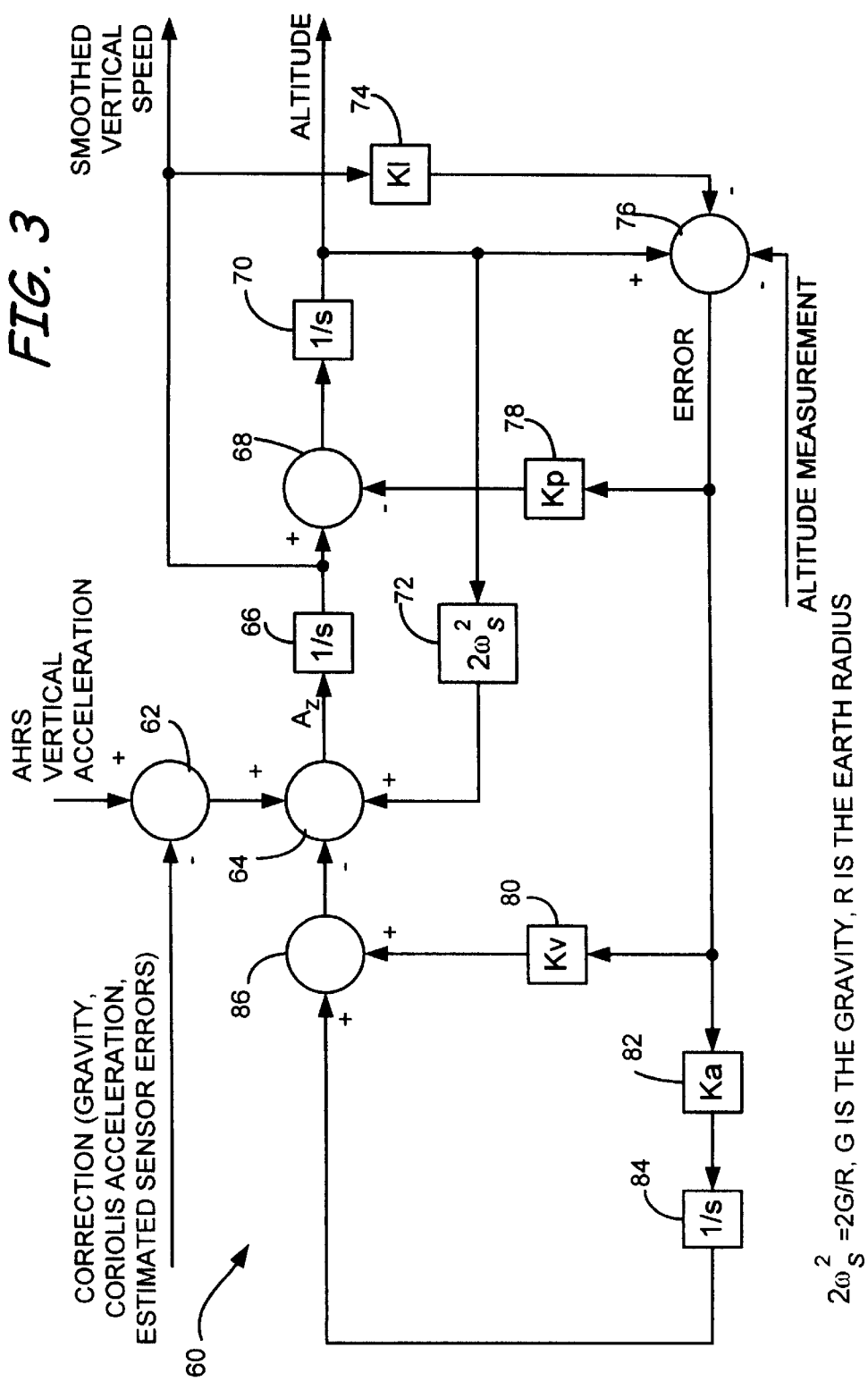
FIG. 3 shows a block diagram of a complementary filter of the GPS/AHRS processor of FIG. 2.

FIG. 3 shows a transfer function block diagram 60 of the processing that occurs at step 48 of functional block diagram 30 of FIG. 2. The AHRS vertical acceleration signal from step 42 of functional block diagram 30 is corrected for gravity, Coriolis acceleration, and estimated sensor errors in step 62. The corrected vertical acceleration signal from step 62 is mathematically integrated in step 66 to produce a vertical speed signal. This vertical speed signal is integrated in step 70 to produce an altitude signal that is used in steps 72 and 76. Step 72 takes the altitude signal and provides a correction signal (based on gravity and the Earth's radius) that is added in step 64 to the corrected vertical acceleration signal from step 62. The vertical speed signal from step 66 is multiplied by a lag constant Kl in step 74 to compensate the lag in the baro-altitude measurement. In step 76, the lag signal from step 74 and the baro-altitude signal from ADC 18 are subtracted from the altitude signal from step 70 to produce an altitude error signal that is used in steps 78, 80, and 82. Step 78 multiplies the altitude error signal by a position constant Kp and provides a correction signal that is subtracted in step 68 from the vertical speed signal from step 66. Step 80 multiplies the altitude error signal by a velocity constant Kv and provides a correction signal that is used in step 86. Step 82 multiplies the altitude error signal by an acceleration constant Ka and provides a correction signal that is integrated in step 84. Constants Kl, Kp, Kv, and Ka are each design parameters chosen for the filter response desired. In step 86, the correction signal from step 84 is added to the correction signal from step 80, and the resulting signal is subtracted in step 64 from the corrected vertical acceleration signal from step 62. The output signals of functional block diagram 60 are the smoothed vertical speed signal from step 66 and the altitude signal from step 70.

Figure 4:
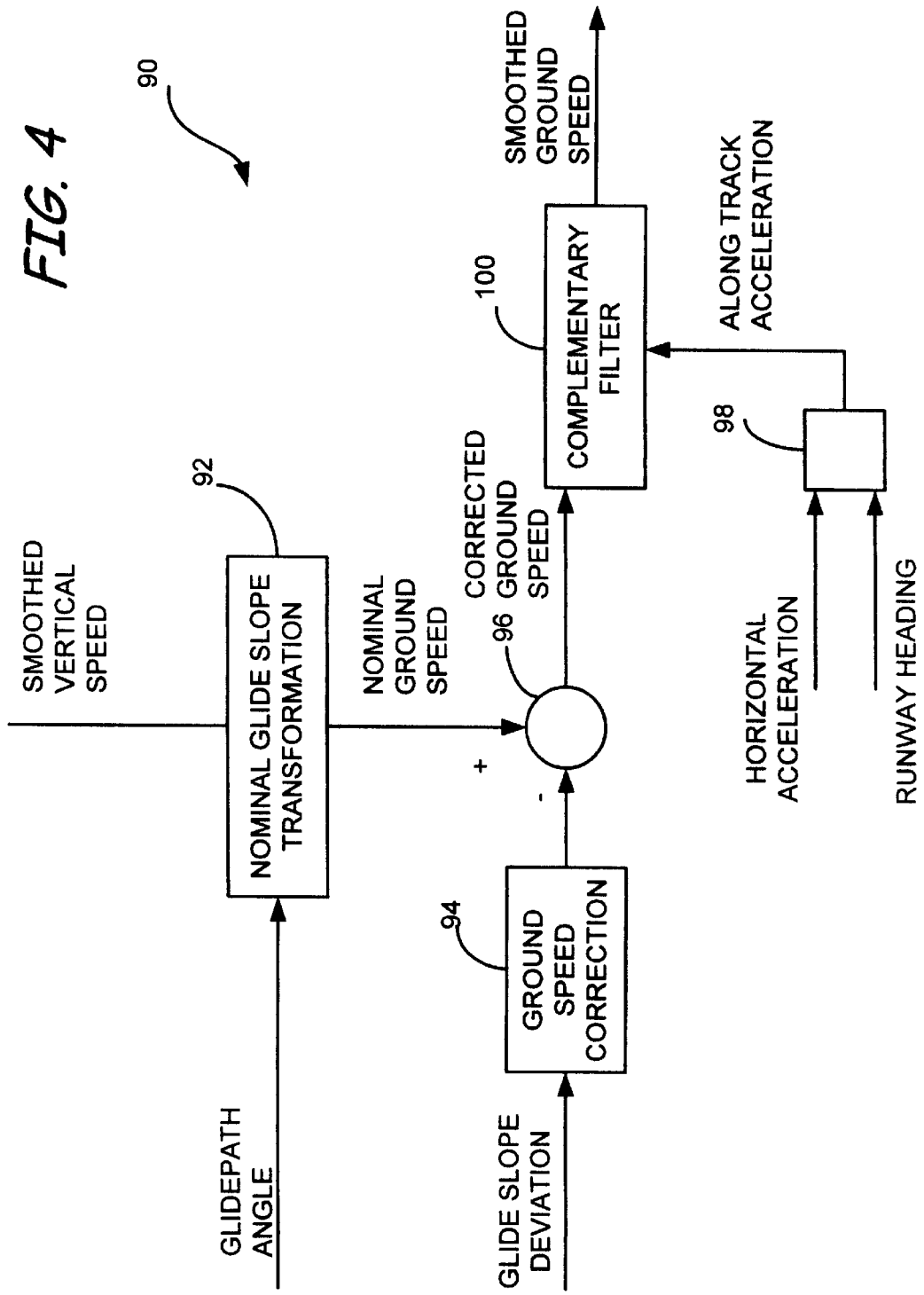
FIG. 4 shows a block diagram of a glideslope-based ground speed monitor of the GPS/AHRS processor of FIG. 2.

FIG. 4 shows a functional block diagram 90 of the processing that occurs at step 52 of functional block diagram 30 of FIG. 2. The glidepath angle data from approach plate charts is used in step 92 to convert the smoothed (complementary-filtered) vertical speed signal from step 48 of functional block diagram 30 to a nominal ground speed signal. The glide slope deviation signal from ILS receiver 20 is used in step 94 to produce a ground speed correction signal. In step 96, the ground speed correction signal from step 94 is subtracted from the nominal ground speed signal from step 92 to produce a corrected ground speed signal. The horizontal acceleration signal from step 40 of functional block diagram 30 and the runway heading data from approach plate charts are used in step 98 to produce an along track acceleration signal. In step 98, the horizontal acceleration signal is projected in the direction of the runway heading to compensate for the crab angle effect. The corrected ground speed signal from step 96 and the along track acceleration signal from step 98 are complementary filtered in step 100 to produce a smoothed ground speed signal.

Figure 5:
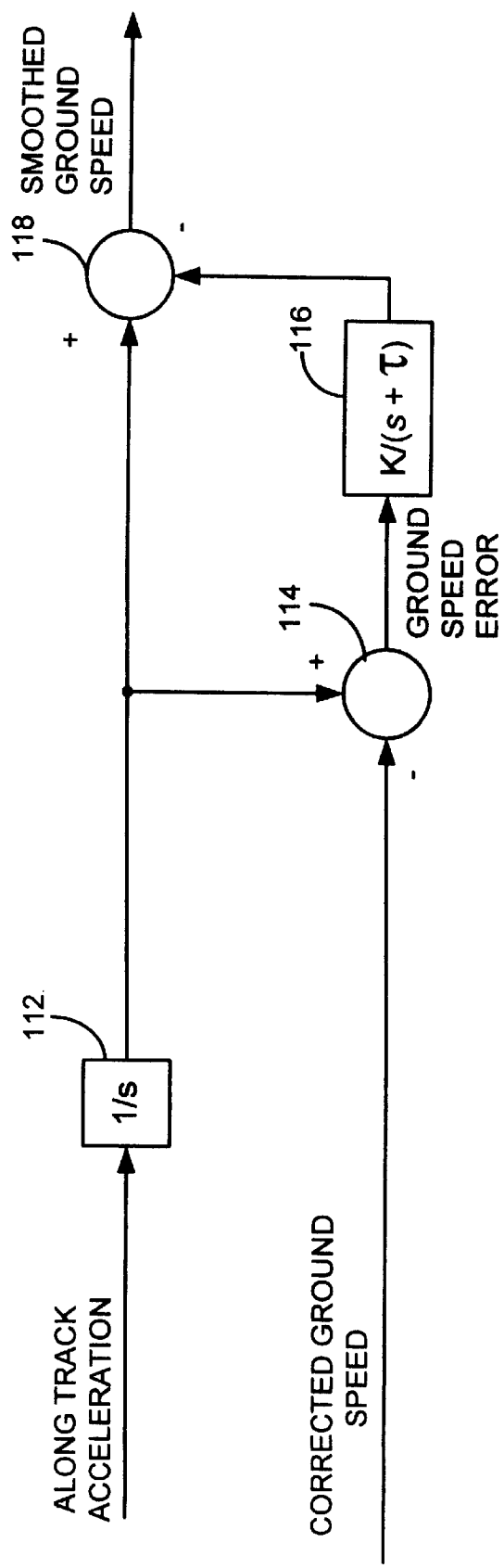
FIG. 5 shows a block diagram of a complementary filter of the glideslope-based ground speed monitor of FIG. 4.

FIG. 5 shows a transfer function block diagram 110 of the processing that occurs at step 100 of functional block diagram 90 of FIG. 4. The along track acceleration signal from step 98 of functional block diagram 90 is mathematically integrated in step 112 to produce an along track ground speed signal. In step 114, the corrected ground speed signal from step 96 of functional block diagram 90 is subtracted from the along track ground speed signal from step 112 to produce a ground speed error signal. This ground speed error signal is filtered by a transfer function block in step 116 to reduce the high frequency noise contribution of the corrected ground speed signal (step 114), where K and $\tau$ are design parameters. In step 118, the output signal from step 116 is subtracted from the along track ground speed signal from step 112 to produce a smoothed ground speed signal.

In summary, the present invention introduces a system and method for accurately monitoring the ground speed of a descending aircraft that is completely independent from a GPS function. By incorporating the present invention, a head-up guidance system can utilize a relatively low-cost integrated GPS/AHRS function to provide very accurate ground speed without the shortcoming of standalone GPS integrity.

Although the present invention has been described with reference to preferred embodiments, workers skilled in the art will recognize that changes may be made in form and detail without departing from the spirit and scope of the invention.

What is claimed is:

1. A method of deriving a ground speed of a descending aircraft, the method comprising:
   producing a smoothed vertical speed signal based upon an altitude signal and a vertical acceleration signal;
   transforming the smoothed vertical speed signal to a ground speed signal based upon glide slope data; and
   producing a smoothed ground speed signal based upon the ground speed signal and a horizontal acceleration signal.

2. The method of claim 1 wherein producing a smoothed vertical speed signal includes complementary filtering the altitude signal and the vertical acceleration signal to produce the smoothed vertical speed signal.

3. The method of claim 2 wherein complementary filtering the altitude signal and the vertical acceleration signal includes correcting the vertical acceleration signal for gravity, Coriolis acceleration, and sensor errors.

4. The method of claim 2 wherein complementary filtering the altitude signal and the vertical acceleration signal includes correcting a vertical speed signal for altitude errors.

5. The method of claim 2 wherein producing a smoothed vertical speed signal includes integrating a corrected vertical acceleration signal.

6. The method of claim 1 wherein the glide slope data includes a glide slope angle signal and a glide slope deviation signal.

7. The method of claim 6 wherein transforming the smoothed vertical speed signal to a ground speed signal includes producing a nominal ground speed signal based upon the smoothed vertical speed signal and the glide path angle signal.

8. The method of claim 7 wherein transforming the smoothed vertical speed signal to a ground speed signal includes producing a ground speed correction signal based upon the glide slope deviation signal.

9. The method of claim 8 wherein transforming the smoothed vertical speed signal to a ground speed signal includes producing a ground speed signal based upon the nominal ground speed signal and the ground speed correction signal.

10. The method of claim 1 wherein producing a smoothed ground speed signal is further based upon a runway heading signal.

11. The method of claim 10 wherein producing a smoothed ground speed signal includes producing an along track acceleration signal based upon the horizontal acceleration signal and the runway heading signal.

12. The method of claim 11 wherein producing an along track acceleration signal includes projecting the horizontal acceleration signal in the direction of the runway heading signal for compensating a crab angle effect.

13. The method of claim 11 wherein producing a smoothed ground speed signal includes complementary filtering the ground speed signal and the along track acceleration signal.

14. The method of claim 13 wherein complementary filtering the ground speed signal and the along track acceleration signal includes integrating the along track acceleration signal to produce an along track ground speed signal.

15. The method of claim 14 wherein complementary filtering the ground speed signal and the along track acceleration signal includes providing a ground speed error signal based upon the ground speed signal and the along track ground speed signal.

16. The method of claim 15 wherein producing a smoothed ground speed signal is based upon the along track ground speed signal and the ground speed error signal.

17. A method of deriving a ground speed of an aircraft on a descent along a flight path, the method comprising:

producing a vertical speed signal as a function of an altitude signal and a vertical acceleration signal;

transforming the vertical speed signal to a nominal ground speed signal based upon a glide slope defined by a glide slope beam;

producing a correction based on a glide slope deviation rate representative of deviation of the aircraft from the glide slope;

correcting the nominal ground speed signal with the correction to produce a corrected ground speed signal; and filtering the corrected ground speed signal with a horizontal acceleration signal to produce a smoothed ground speed signal.

18. The method of claim 17 wherein producing a vertical speed signal includes complementary filtering the altitude signal and the vertical acceleration signal to produce the vertical speed signal.

19. The method of claim 17 wherein the horizontal acceleration signal is compensated for a crab angle effect using a runway heading signal.

20. A method of deriving a ground speed of an aircraft on a descent along a flight path, the method comprising:

complementary filtering an altitude signal and a vertical acceleration signal to produce a smoothed vertical speed signal;

transforming the smoothed vertical speed signal to a horizontal speed signal as a function of glide slope; and complementary filtering the horizontal speed signal and a horizontal acceleration signal to produce a smoothed ground speed signal.

21. The method of claim 20 wherein transforming the smoothed vertical speed signal to a horizontal speed signal comprises:

transforming the smoothed vertical speed signal to a nominal horizontal speed signal based upon a desired glide slope; and correcting the nominal horizontal speed signal as a function of a glide slope deviation rate to produce the horizontal speed signal.

* * * * *